United States Patent [19]

Wu

[11] Patent Number: 5,704,629
[45] Date of Patent: Jan. 6, 1998

[54] FOLDING FRAME ASSEMBLY OF A GOLF CART

[76] Inventor: Ching-Chang Wu, No. 35-1, Jih Hsin Street, Tu Cheng Hsiang, Taipei Hsien, Taiwan

[21] Appl. No.: 742,814

[22] Filed: Nov. 1, 1996

[51] Int. Cl.$^6$ ............................................. B62B 1/04
[52] U.S. Cl. ........................................ 280/646; 280/652
[58] Field of Search ........................... 280/646, 38, 651, 280/652, 42, 47.24, 47.26, 47.27, 47.28, DIG. 6, 47.315

[56] References Cited

U.S. PATENT DOCUMENTS

| | | | |
|---|---|---|---|
| 2,518,803 | 10/1950 | Marvin | 280/47.26 |
| 5,249,822 | 10/1993 | Wu | 280/473.15 |
| 5,281,044 | 1/1994 | Chen | 280/DIG. 6 |
| 5,288,099 | 2/1994 | Wu | 280/DIG. 6 |
| 5,409,253 | 4/1995 | Cheng | 280/646 |
| 5,464,238 | 11/1995 | Wu | 280/646 |

*Primary Examiner*—Richard M. Camby
*Attorney, Agent, or Firm*—Varndell Legal Group

[57] ABSTRACT

A folding frame assembly of a golf cart which includes a handle having a handle connector pivoted to a handle bracket at one end of a front bag cradle on the main frame of a golf cart, wherein the handle connector has a hook adapted for hooking up with a retainer member in the front bag cradle to lock the handle in the operative position; a press control member is mounted in a hole in the front bag cradle and controlled to disengage the retainer member from the hook of the handle connector for permitting the handle to be collapsed; and a spring is mounted in the front bag cradle to impart a pressure to the press control member so that the press control member is automatically returned to its former position after each operation.

1 Claim, 11 Drawing Sheets

FOLDING FRAME ASSEMBLY OF A GOLF CART

BACKGROUND AND SUMMARY OF THE INVENTION

The present invention relates to golf carts, and relates more particularly to the folding frame assembly of a golf cart which has a retainer member controlled by a spring-supported press control member to lock the handle in the operative position.

Figure 1:
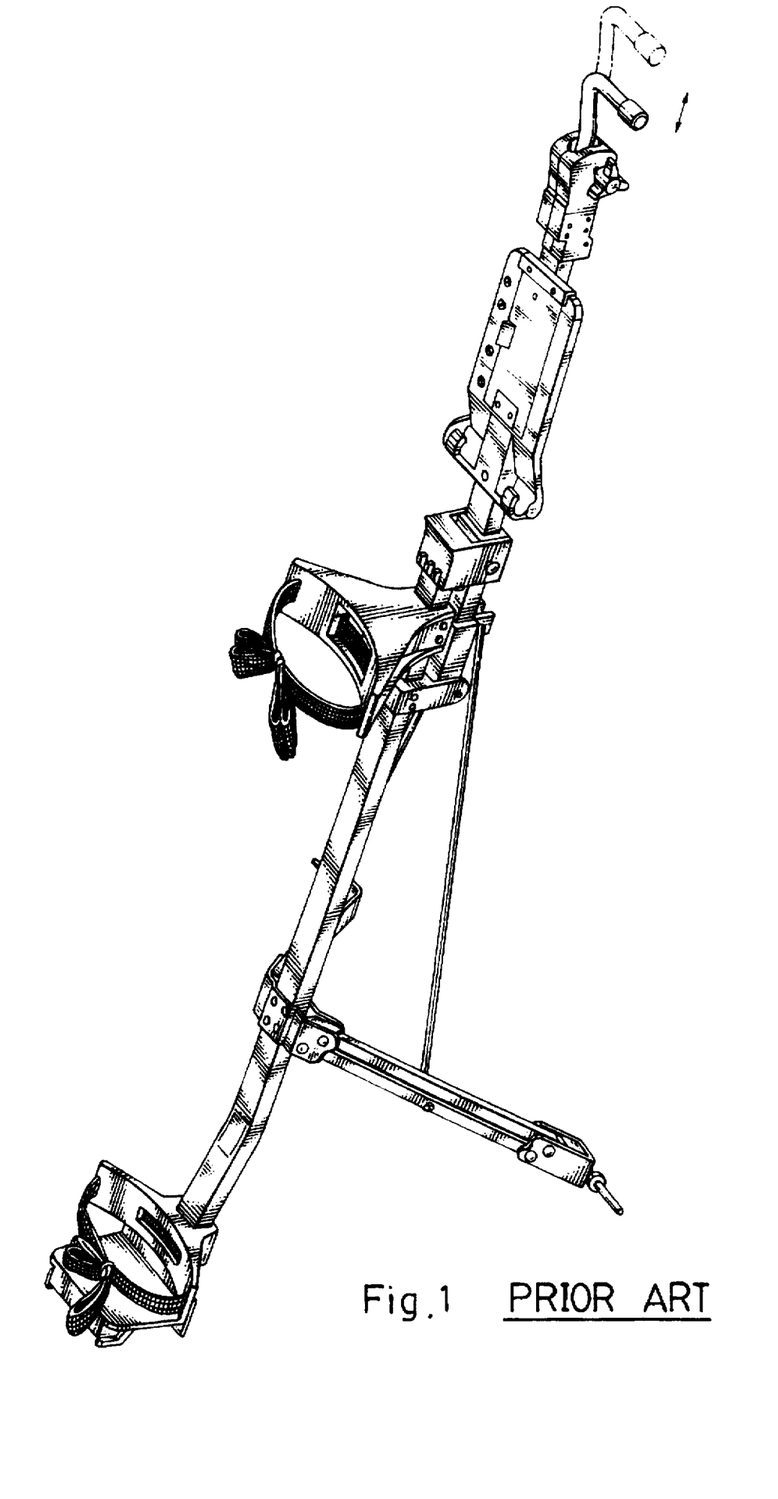
FIG. 1 is a perspective elevational view of a telescopic and folding frame assembly for a golf cart according to U.S. Pat. No. 5,294,822.
Figure 2:
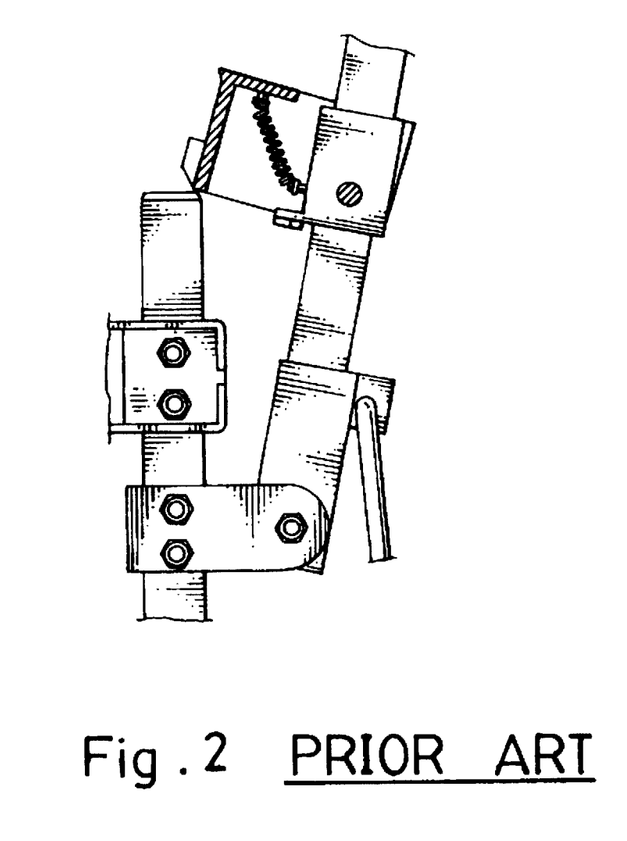
FIG. 2 is a side view of the folding frame bar mounting structure of the telescopic and folding frame assembly of FIG. 1.
Figure 3:
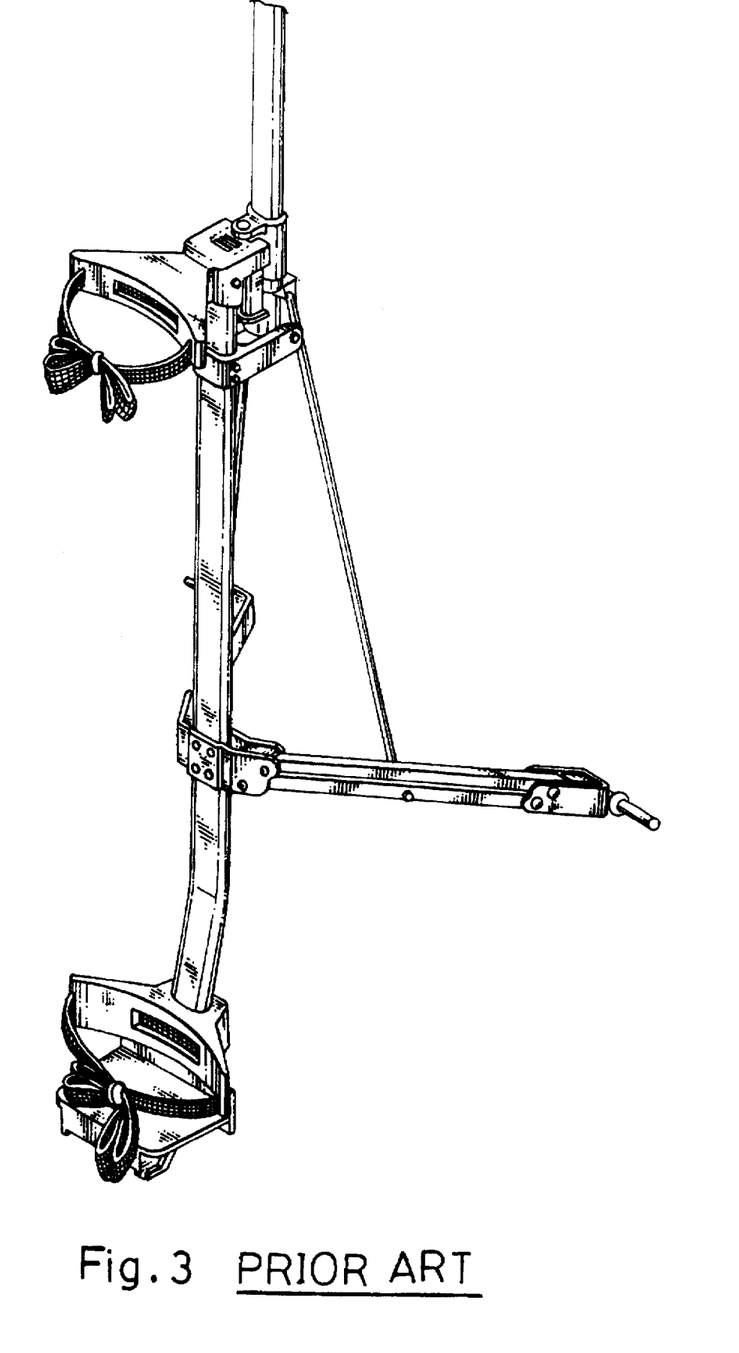
FIG. 3 is an elevational view of an angle-adjustable folding frame assembly for a golf cart according to U.S. Pat. No. 5,464,238.
Figure 4:
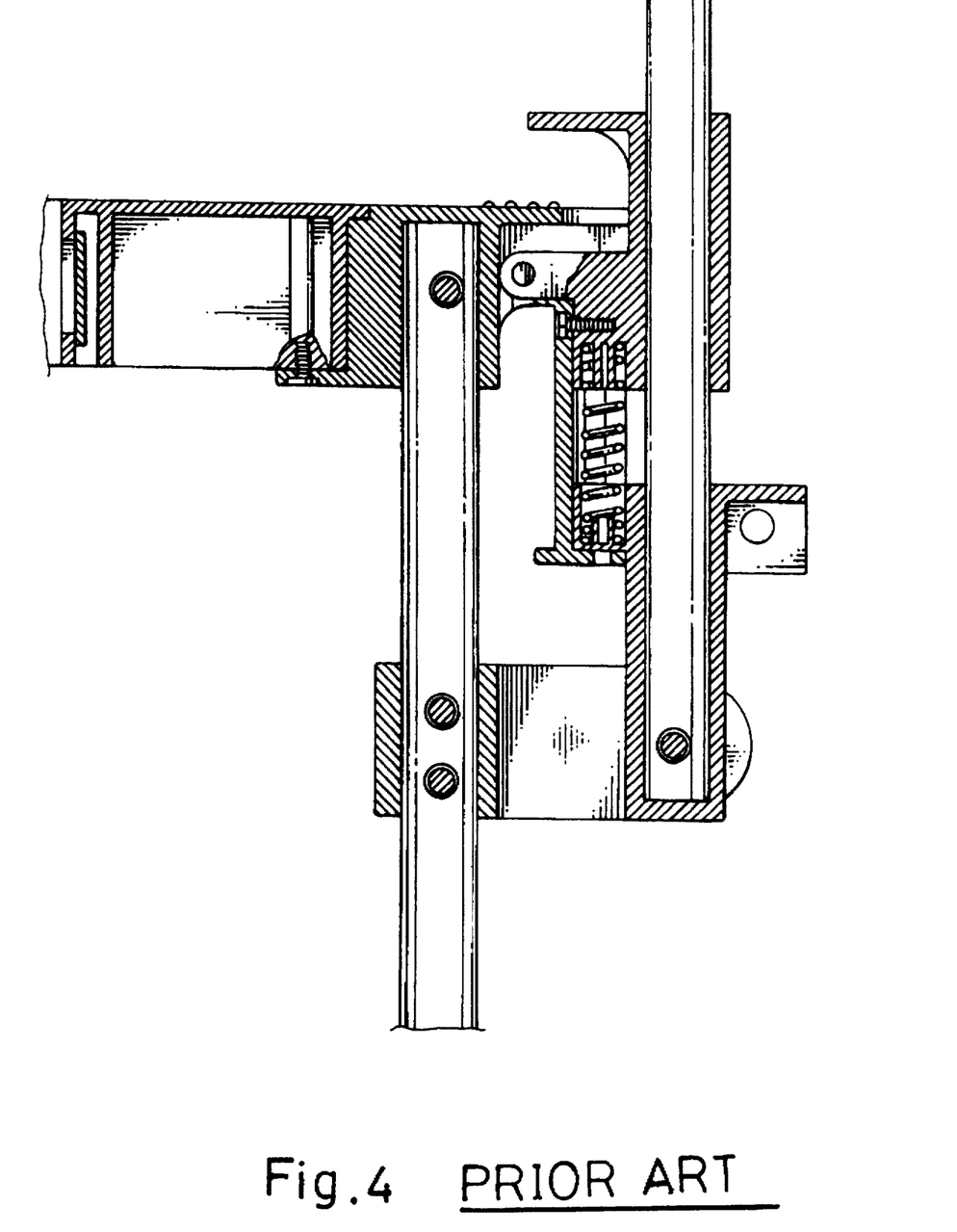
FIG. 4 is a side view in section of a part of the angle-adjustable folding frame assembly shown in FIG. 3.
Figure 5:
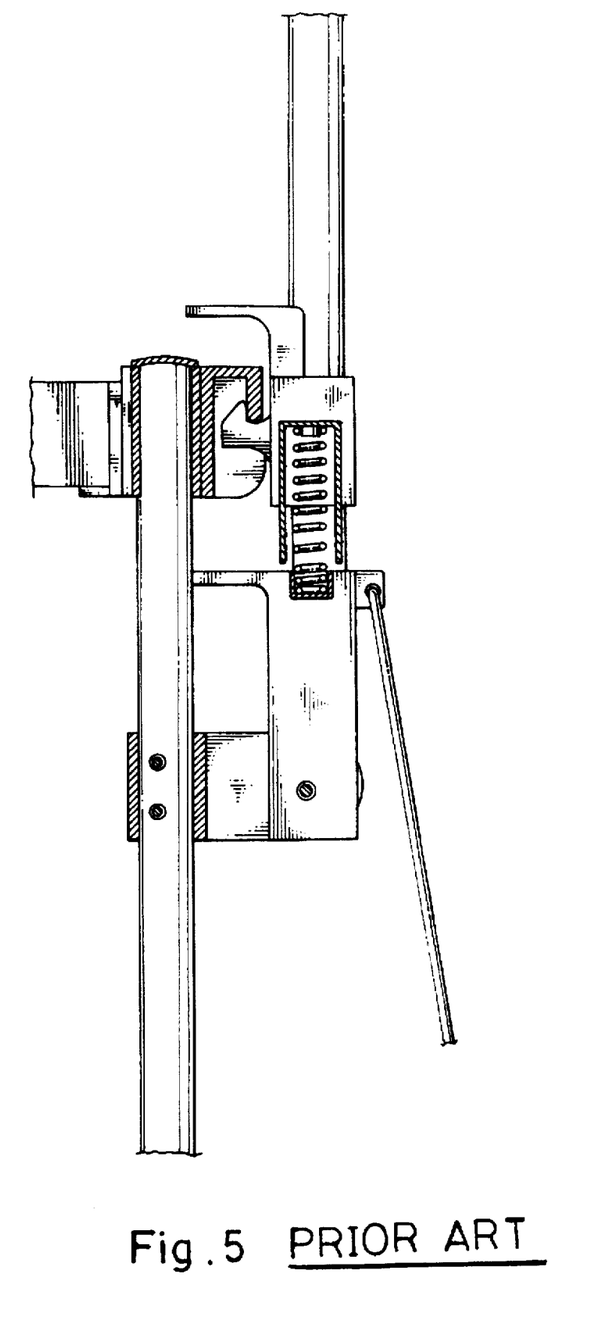
FIG. 5 is a side view in section of a part of the folding frame assembly for a golf cart according to U.S. patent application Ser. No. 08/588,884.

The frame assembly of a golf cart is generally made telescopic or folding collapsible so that the size of the golf cart can be minimized when not in use. Examplars are seen in U.S. Pat. No. 5, 294,822 entitled "Telescopic folding frame assembly for a golf cart", U.S. Pat. No. 5,454,238 entitled "Angle-Adjustable Folding Frame Assembly for a Golf Cart", the disclosure of the folding frame assembly of U.S. patent application No. 08/588,884. These folding frame assemblies are functional, however they still have drawbacks. According to the disclosure of the telescopic folding frame assembly of U.S. Pat. No. 5,249,822, as shown in FIGS. 1 and 2, there is a gap left between the frame member and the locking plate when the frame assembly is extended out, therefore the handle tends to vibrate and a noise tends to be produced during the movement of the golf cart; the spring wears quickly with use because it is stretched in a curved course; the collapsing operation of the telescopic folding frame assembly must be operated with both hands; the folding collapsible mechanism is comprised of a big number of parts which greatly increas the manufacturing cost of the telescopic folding frame assembly. According to the disclosure of the angle-adjustable folding frame assembly of U.S. Pat. No. 5,464,238, as shown in FIGS. 3 and 4, it is not easy to quickly set the first locating member into position between it is movably mounted around the handle; the first locating member tends to vibrate when it is moved along the handle because the slide block is connected to the first locating member by a screw and driven by the first locating member to compress the spring; when the golf cart is moving, the handle tends to vibrate because of insufficient support between the handle and the main frame; because of the minitation of the size of the second locating member, the adjusting angle is limited to two positions. According to the disclosure of folding frame assembly of U.S. patent application No. 08/588,884, as shown in FIG. 5, the handle can be folded up only when the member is pressed downwards and the hook of the member is completely disengaged from the member; when collapsing the frame assembly, the main frame must be held with one hand when the handle is turned with the other hand; because the spring has a certain length and is connected between member and member, it tends to rub the inside walls of the members during the movement of the golf cart, causing a noise to be produced; members needs much installation space, and their installation destroy the sense of beauty of the golf cart.

The present invention has been accomplished to provide a folding frame assembly for golf carts which eliminates the aforesaid drawbacks. According to the present invention, the folding frame assembly comprises a main frame a first bag cradle and a second bag cradles respectively mounted on the mainframe at two opposite ends, a handle bracket fastened to the front end of the main frame and integrally connected to the first bag cradle, a wheel bracket fastened to the mainframe to hold two ground supporting wheels, a handle pivoted to the handle bracket by a handle connector, and two links pivotably connected between the handle connector and the wheel bracket, wherein the first bag cradle comprises a front recess, a locating hole in the front recess, and two locating ribs raised from a bottom side thereof; the handle connector has a hook raised from a front side thereof and adapted for hooking up with a retainer member in the first bag cradle to secure the handle in the operative position; a retainer member is moved in the first bag cradle relative to the locating hole and adapted for hooking up with the hook of the handle connector to hold the handle in the operative position, the retainer member comprising a barrel moved relative to and disposed in longitudinal alignment with the locating hole of the first bag cradle, and a hooked portion raised from the periphery of the periphery of the barrel and moved between the two locating ribs of the first bag cradle and adapted for hooking up with the hook of the handle connector, the hooked portion having a guide slope adapted for guiding the hook of the handle connector into engagement with the hooked portion of the retainer member; a press control member is mounted in the locating hole of the first bag cradle and forced to disconnector the retainer member from the hook of the handle connector, the press control member comprising a head disposed outside the locating hole of the first bag cradle, a bolt body having one end perpendicularly extended from the head and inserted through the locating hole of the first bag cradle and the barrel of the retainer member and an opposite end terminating in a screw rod screwed up with a nut; a spring is mounted around the bolt body of the press control member within the locating hole of the first bag cradle to impart a pressure to the press control member, causing it to pull the retainer member into a position for engagement with the hook of the handle connector.

DETAILED DESCRIPTION OF THE PREFERRED EMBODIMENT

Referring to FIGS. from 6 to 11, a folding frame assembly in accordance with the present invention is generally comprised of a handle 1, a press control member 11, a retainer member 12, a handle connector 15, a main frame 2, a handle bracket 241, a spring 16, a wheel bracket 23, two links 17, a first bag cradle 24, and a second bag cradle.

Figure 6:
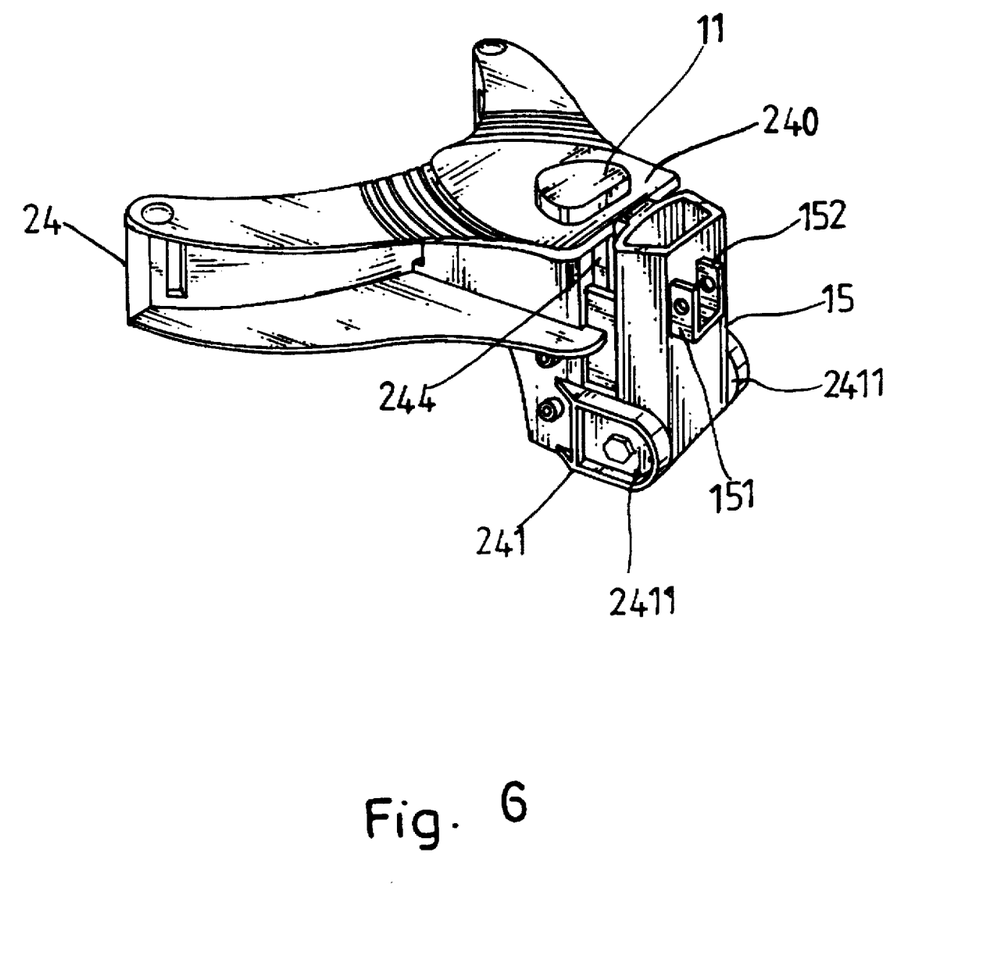
FIG. 6 is an elevational view of a part of the present invention, showing the handle connector pivoted to the handle bracket and secured to the first bag cradle.
Figure 7:
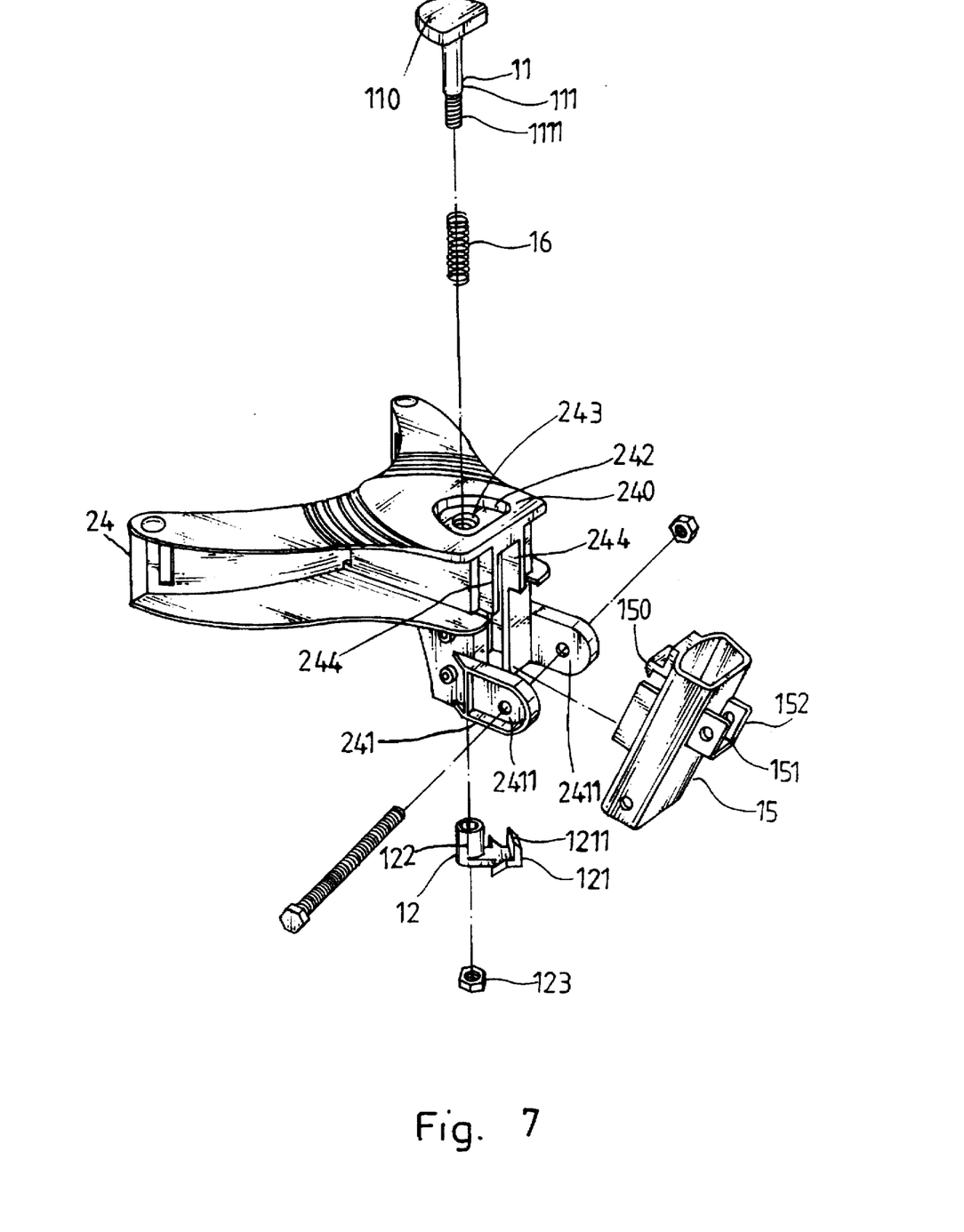
FIG. 7 is an exploded view of FIG. 6.
Figure 11:
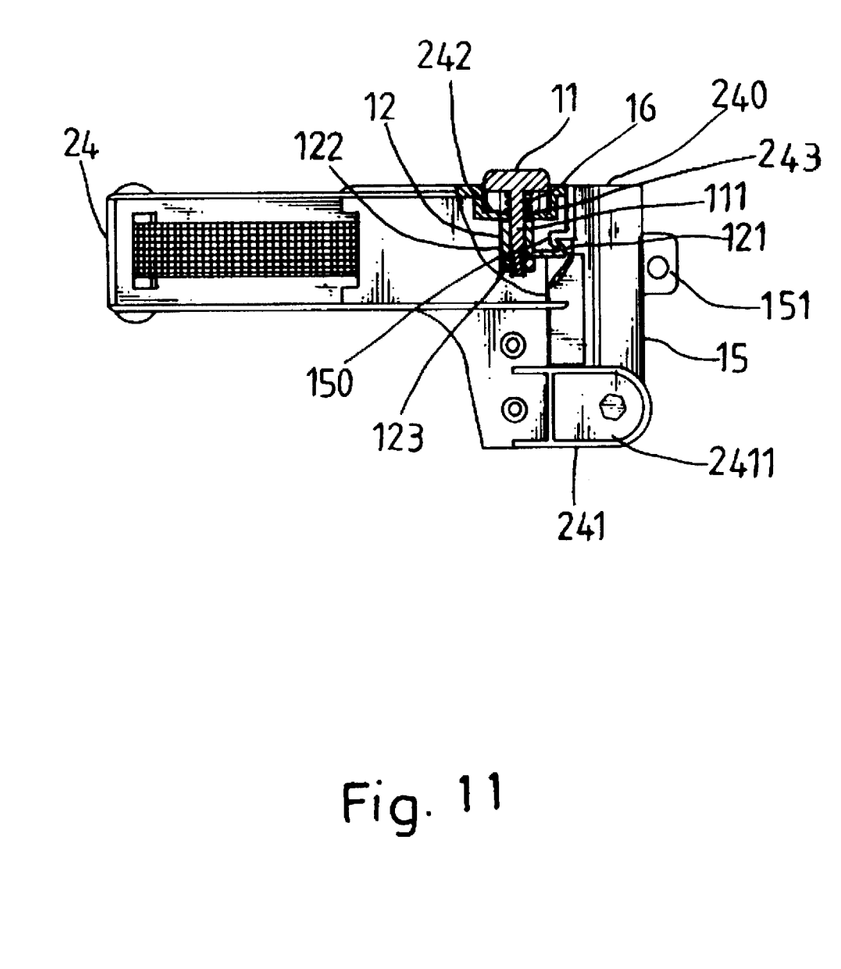
FIG. 11 is a sectional view of FIG. 6.

The handle 1 has a front end terminating in a handle grip (not shown), and a rear end fixedly connected to the handle connector 15. The handle connector 15 is fixedly fastened to the rear end of the handle 1 and pivoted to the handle bracket 241, having a pair of lugs 151, 152 raised from a back side thereof and respectively connected to the respective top ends 171 of the links 17, and a hook 150 raised from a front side thereof and adapted for hooking up with the retainer member 12. The wheel bracket 23 is fixedly mounted on the main frame 2 at a suitable location between the first bag cradle 24 and the second bag cradle, having two pivoted side beams 231 respectively and pivotably connected to the respective bottom ends 172 of the links 17 and adapted for holding two ground supporting wheels (not shown). The handle bracket 241 is fixedly fastened to one end (namely, the front end) of the main frame 2, having two parallel lugs 2411 bilaterally pivoted to the handle connector 15. The first bag cradle 24 is fixedly fastened to the front end of the main frame 2 to hold the press control member 11, the spring 16, and the retainer member 12. The retainer member 12 comprises barrel 122, a hooked portion 121 raised from the periphery of the barrel 122 and adpated for hooking up with the hook 150 of the handle connector 15. The hooked portion 121 has a guide slope 1211 adapted for guiding the hook 150 of the handle connector 15 into engagement with the hooked portion 121 of the retainer member 12. The first bag cradle 24 and the handle bracket 241 are made in integrity, and the handle bracket 241 is connected to the first bag cradle 24 at the rear side. The first bag cradle 24 comprises a front wall 240, a front recess 242 at the front wall 240, a locating hole 243 in the front recess 242, and two locating ribs 244 adapted for guiding the movement of the hooked portion 121 of the retainer member 12. The press control member 11 is headed bolt movably mounted in the locating hole 243 of the first bag cradle 24, comprising a head, a bolt body 111 perpendicularly extended from the head and terminating in a screw rod 1111. The bolt body 111 of the press control member 11 is inserted through the locating hole 243 of the first bag cradle 24 and the barrel 122 of the retainer member 12 and then screwed up with a nut 123. Then assembled, the hooked portion 121 passes through the gap between the locating ribs 244 to the outside of the first bag cradle 24. The spring 16 is mounted around the bolt body 111 of the press control member 11 inside the locating hole 243 of the first bag cradle 24 to impart a pressure to the press member 11, causing the head 110 of the press member 11 to be moved out of the front recess 242 of the front wall 240 of the first bag cradle 24.

Figure 8:
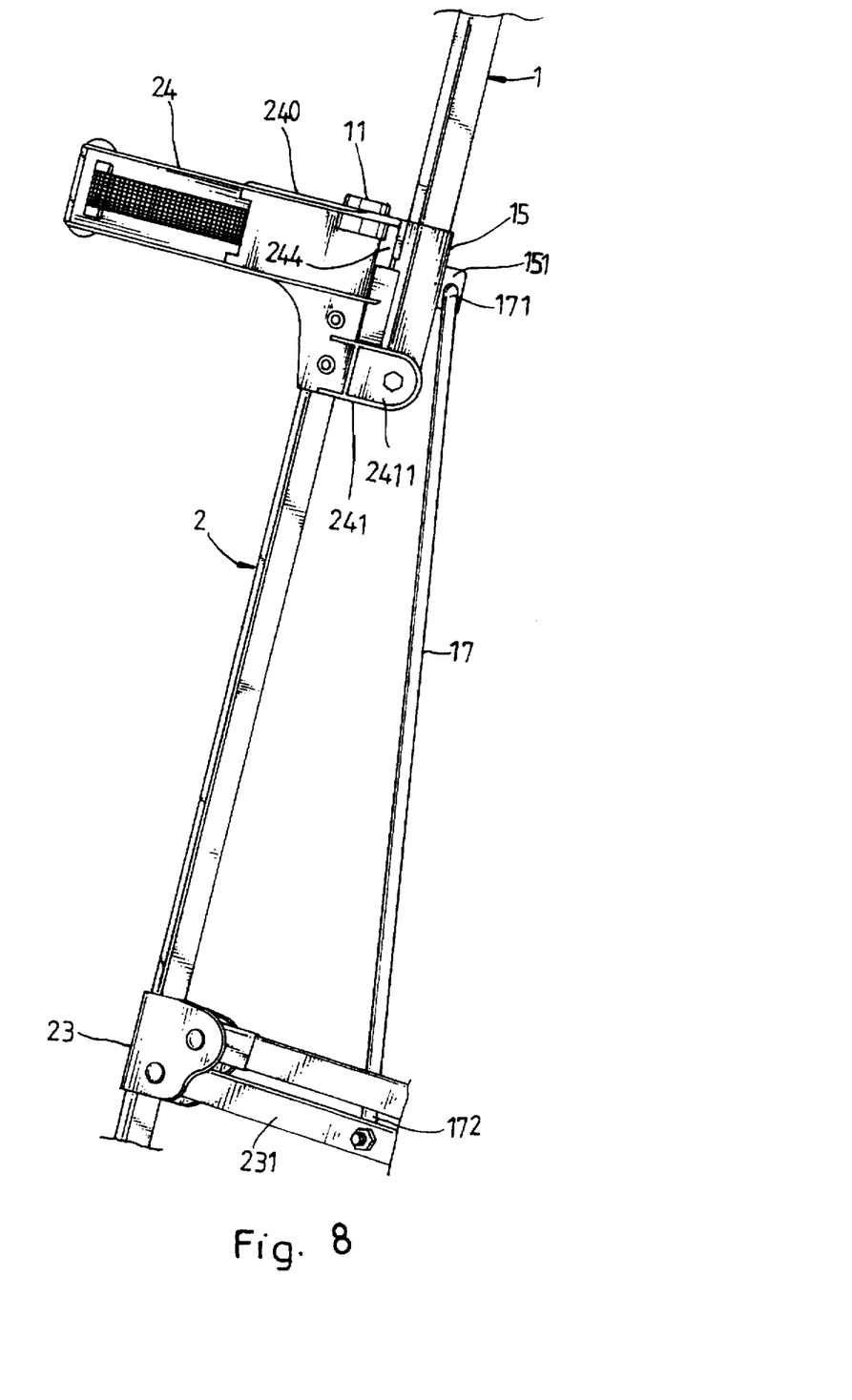
FIG. 8 is a side view of the present invention, showing the folding frame assembly extended out and the handle locked in the operative position.
Figure 9:
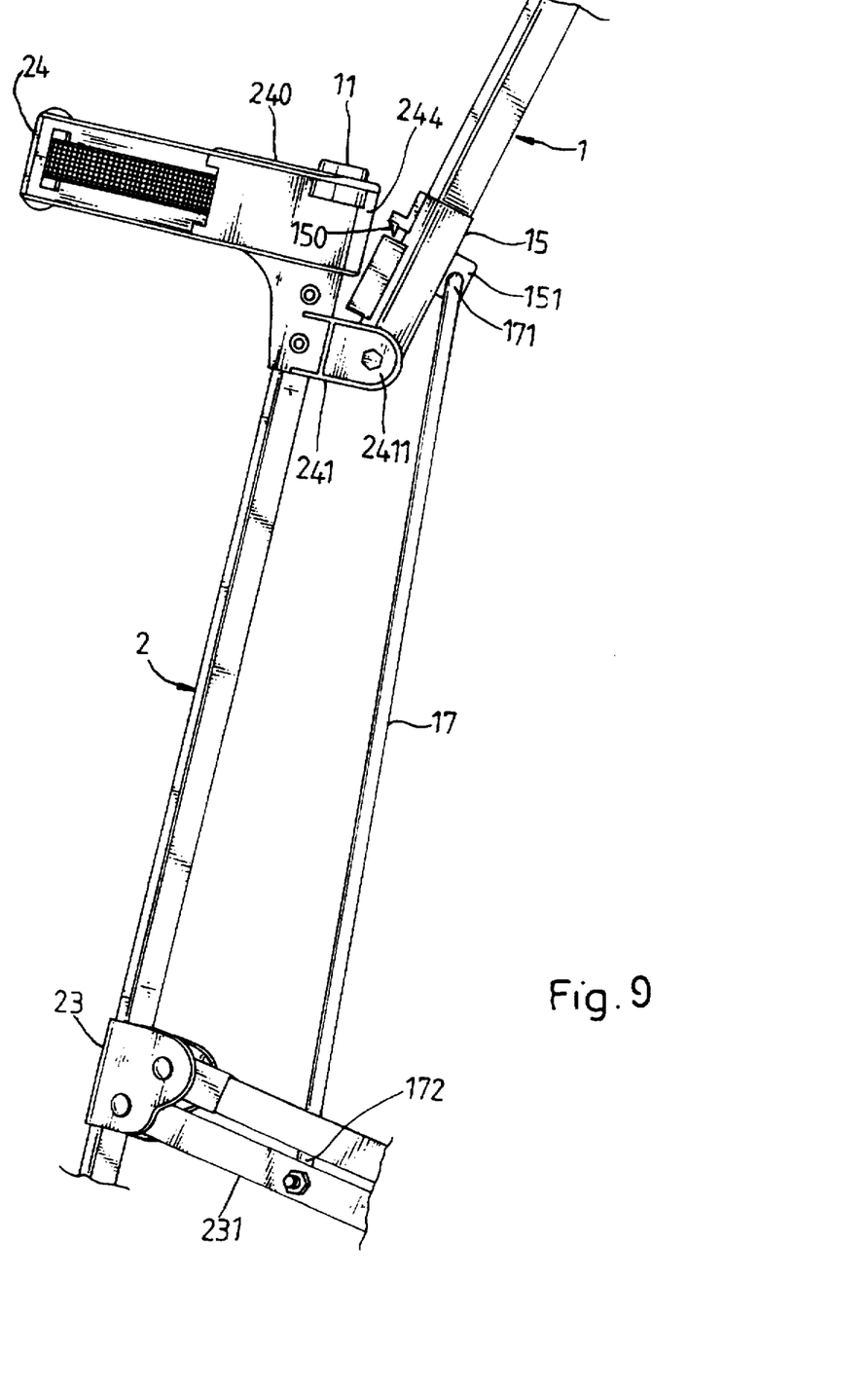
FIG. 9 is another side view of the present invention, showing the handle connector unlocked.
Figure 10:
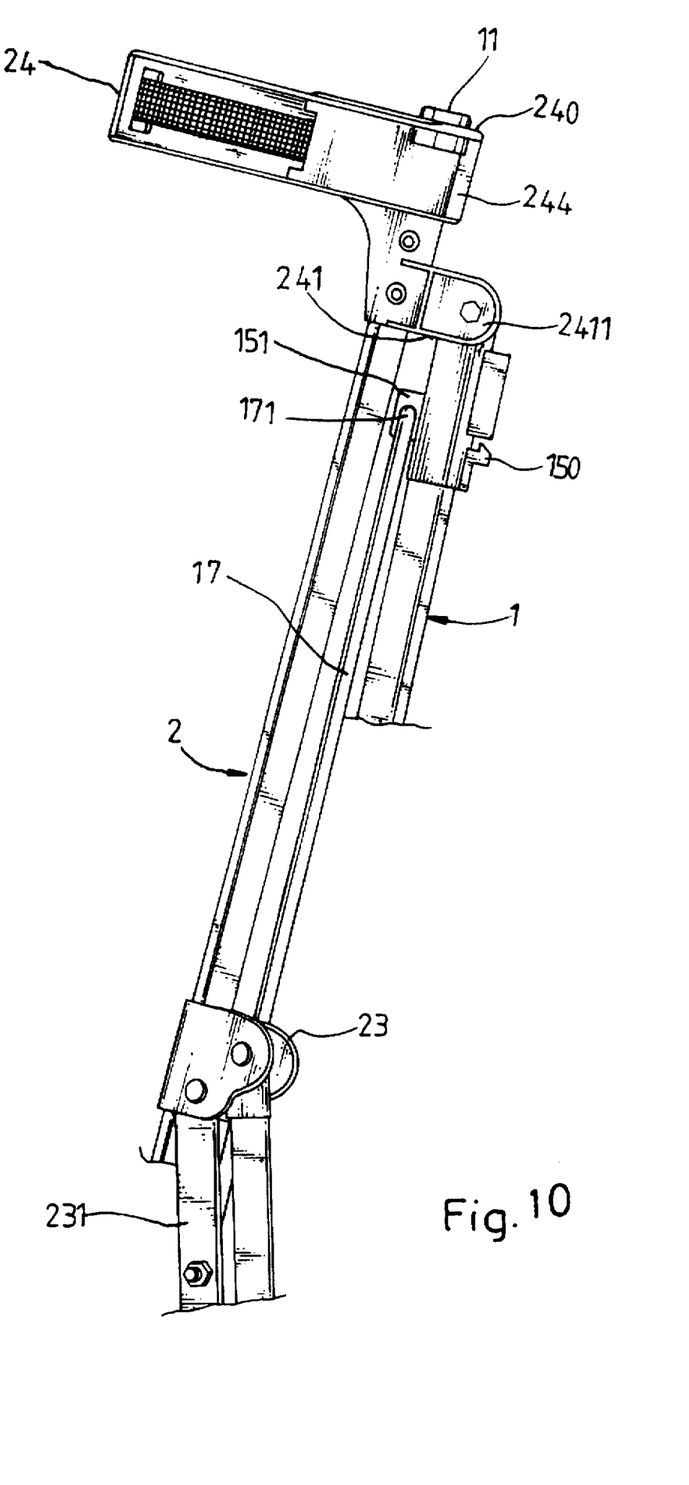
FIG. 10 is still another side view of the present invention, showing the handle collapsed.

When the press control member 11 is depressed, the retainer member 12 is lowered with the press control member 11, causing the hooked portion 121 of the press control member 11 to be disengaged from the hook 150 of the handle connector 15, for permitting the handle 1 is be folded up from the operative position shown in FIG. 8 to be collapsed position shown in FIG. 10. When the press control member 11 is released, the spring 16 automatically pushes the press control member 11 back to its former position. When the handle 1 is turned outwards from the collapsed position to the operative position, the hook 150 of the handle connector 15 is guided by the guide slope 1211 into engagement with the hooked portion 121 of the retainer member 12, and therefore the handle 1 is locked in the operative position.

I claim:
1. A folding frame assembly of a golf cart, comprising:
   a main frame having a front end and a rear end;
   a first bag cradle fixedly fastened to the front end of said mainframe;
   a second bag cradle fixedly fastened to the rear end of said mainframe;
   a handle bracket fixedly fastened to the front end of said main frame behind said first bag cradle and integrally connected to said first bag cradle;
   a wheel bracket fixedly mounted to said main frame and spaced between said handle bracket and said second bag cradle, said wheel bracket having two pivoted side beams adapted for holding two ground supporting wheels;
   a handle having a front end terminating in handle grip, and a rear end;
   a handle connector fixedly fastened to the rear end of said handle and pivoted to said handle bracket; and
   two links pviotably connected between said handle connector and the side beams of said wheel bracket;
   wherein:
   said first bag cradle comprises a front wall, of ront recess at said front wall, a locating hole in said front recess, and two locating ribs raised from a bottom side thereof;
   said handle connector has a hook raised from a front side thereof and adapted for hooking up with a retainer member in said first bag cradle to secure said handle in the operative position;
   a retainer member is moved in said first bag cradle relative to said locating hole and adapted for hooking up with the hook of said handle connector to hold said handle in the operative position, said retainer member comprising a barrle moved relative to and disposed in longitudinal alignment with the locating hole of said first bag cradle, and a hooked portion raised from the pereiphery of said barrel and moved between the two locating ribs of said first bag cradle and adapted for hooking up with the hook of said handle connector, said hooked portion having a guide slope adapted for guiding the hook of said handle connector into engagement with the hooked portion of said retainer member;
   a press control member is mounted in the locating hole of said first bag cradle and forced to disconnect said retainer member from the hook of said handle connector, said press control member comprising a head disposed outside the locating hole of said first bag cradle, a bolt body having one end perpendicularly extended from said head and inserted through the locating hole of said first bag cradle and the barrel of said retainer member and an opposite end terminating in a screw rod screwed up with a nut;
   a spring is mounted around the bolt body of said press control member within the locating hole of said first bag cradle to impart of pressure to said press control member, causing it to pull said retainer member into position for engagement with the hook of said handle connector.

* * * * *